(12) United States Patent  
Moliton et al.

(10) Patent No.: US 8,057,033 B2
(45) Date of Patent: Nov. 15, 2011

(54) OPHTHALMIC LENS AND A DISPLAY INCLUDING SUCH A LENS AND AN OPTICAL IMAGER

(75) Inventors: Renaud Moliton, Paris (FR); Gilles Le Saux, Paris (FR)

(73) Assignee: Essilor International, Charenton-le-Pont (FR)

( * ) Notice: Subject to any disclaimer, the term of this patent is extended or adjusted under 35 U.S.C. 154(b) by 811 days.

(21) Appl. No.: 10/589,313

(22) PCT Filed: Feb. 17, 2005

(86) PCT No.: PCT/FR2005/050100
§ 371 (c)(1),
(2), (4) Date: Jun. 16, 2009

(87) PCT Pub. No.: WO2005/081036
PCT Pub. Date: Sep. 1, 2005

(65) Prior Publication Data
US 2009/0296043 A1   Dec. 3, 2009

(30) Foreign Application Priority Data
Feb. 18, 2004   (FR) ..................................... 04 50294

(51) Int. Cl.
*G02C 1/00* (2006.01)
*G02B 27/14* (2006.01)

(52) U.S. Cl. ........................................ 351/158; 359/630

(58) Field of Classification Search ................... 351/159, 351/158
See application file for complete search history.

(56) References Cited

U.S. PATENT DOCUMENTS

| 4,364,645 | A | * | 12/1982 | Feinbloom | 351/204 |
| 4,867,551 | A | * | 9/1989 | Perera | 351/158 |
| 5,384,607 | A | * | 1/1995 | Morris et al. | 351/158 |
| 5,739,797 | A | * | 4/1998 | Karasawa et al. | 345/8 |
| 6,204,974 | B1 | | 3/2001 | Spitzer et al. | 359/630 |
| 6,353,503 | B1 | | 3/2002 | Spitzer et al. | 359/630 |
| 6,910,769 | B2 | * | 6/2005 | Renard | 351/164 |
| 6,945,648 | B2 | * | 9/2005 | Schindler et al. | 351/158 |
| 2003/0231282 | A1 | | 12/2003 | Saux et al. | 351/168 |

FOREIGN PATENT DOCUMENTS

FR  2828743  2/2003
WO  0106298  7/2000

OTHER PUBLICATIONS

International Search Report—Sep. 1, 2004.
French Search Report—Jun. 8, 2005.

* cited by examiner

*Primary Examiner* — Jordan Schwartz
(74) *Attorney, Agent, or Firm* — Sofer & Haroun, LLP

(57) ABSTRACT

The invention relates to an ophthalmic lens for constituting an ophthalmic display, associated with an optical imager for shaping light beams and directing them towards the eye of the wearer so as to enable information content to be viewed, said optical imager being secured to said lens. According to the invention, the lens is associated with marking including referencing for the position of said imager relative to said lens as a function of the correction parameters of said lens.

5 Claims, 3 Drawing Sheets

OPHTHALMIC LENS AND A DISPLAY INCLUDING SUCH A LENS AND AN OPTICAL IMAGER

RELATED APPLICATIONS

The present application is a national phase application of PCT/FR2005/050100, which in turn claims the benefit of priority from French Patent Application No. 04 50294, filed on Feb. 18, 2004, the entirety of which are incorporated herein by reference.

FIELD OF THE INVENTION

The present invention relates to an ophthalmic lens for constituting an ophthalmic display that comprises such a lens and an optical imager for projecting information of the multimedia or image type. The term "lens" is used for an optical system that can be positioned in particular in a spectacles frame.

BACKGROUND OF THE INVENTION

U.S. Pat. No. 5,886,822 discloses an ophthalmic lens presenting a projection insert. Such a projection insert is constituted by an optical imager for shaping light beams coming from an electronic and optical system that generates light beams from an electronic signal, the system being of the miniature screen, laser diode, or light-emitting diode (LED) type. The optical imager directs light beams towards the eye of the wearer so as to enable information content to be used.

Such a type of lens with an optical imager inserted in the lens, e.g. by molding as described in patent document FR 2 828 743, poses the following technical problems.

For a non-correcting lens, it is necessary to make a lens of thickness that is relatively great, corresponding to the thickness of the optical imager.

For a correcting lens, i.e. a lens that also serves to correct the sight of the wearer, it is necessary to make a lens of thickness that is even greater, corresponding to the thickness of the optical imager plus the extra thickness introduced by the curving of the faces to provide the ophthalmic correction.

Such a lens is heavy and unattractive in appearance.

Also known, from patent document WO 01/06298 is an ophthalmic display comprising a lens and an optical imager for shaping light beams and directing them towards the eye of the wearer so as to enable information content to be used, the optical imager being secured to said lens.

However, such a display is not adapted to the requirements of an ophthalmic lens.

OBJECTS AND SUMMARY OF THE INVENTION

The invention solves this problem, and to do it provides an ophthalmic lens for constituting an ophthalmic display, associated with an optical imager for shaping light beams and directing them towards the eye of the wearer so as to enable information content to be viewed, said optical imager being secured to said lens, the lens being associated with marking including referencing for the position of said imager relative to said lens as a function of the correction parameters of said lens.

Here and below, the term "secured" should be understood strictly, i.e. excluding insertion of the type involving integration by overmolding.

By way of example, the optical imager can be of the same type as that described in above-mentioned U.S. Pat. No. 5,886,822.

The term "lens" should be understood as designating in particular an optionally-correcting lens for mounting in a spectacles frame. The ophthalmic spectacles lens may present, for example, the functions that are traditional in this application, correcting eyesight, protection against reflection, against dirtying, against scratching, etc.

The term lens should be understood as covering equally well a finished lens ready for mounting in a frame and a lens that is semi-finished, i.e. that still needs to be subjected to at least one kind of treatment, e.g. a surfacing operation, prior to being usable.

Such a semi-finished lens possesses the properties of a semi-finished ophthalmic lens, i.e. in the semi-finished state its rear face does not have any particular optical function and has yet to be surfaced, i.e. blanked and polished in order to obtain a finished ophthalmic lens with the prescription to enable the wearer to see the surroundings.

Such marking can consist of an engraving in the lens, a stamp on the lens, or a medium carrying the marking such as a label associated with one or more lenses.

In a preferred embodiment, said referencing is performed relative to a virtual theoretical center of the eye.

Preferably, said marking comprises the position of the far vision point and information defining said virtual theoretical center of the eye.

Advantageously, the information defining the virtual theoretical center of the eye are the value of the shape angle of the wearer's spectacles frame, the value of the panthoscopic angle of the spectacles frame, and a distance corresponding to the distance between the lens and the center of the wearer's eye.

Said marking may comprise the direction cosines of an information line of sight corresponding to the line passing through said virtual theoretical center of the eye and the center of the image obtained by means of the optical imager in the frame of reference relative to the lens.

Said information line of sight is as it is to be perceived by the wearer. Its position is thus selected arbitrarily in the visual space of the wearer, in a frame of reference relative to the lens. In practice, it is obtained by means of the optical imager of the ophthalmic display and it is modified by passing through all or part of the ophthalmic lens associated with the display.

Said marking may also include a value for the power compensation to be contributed by the imager.

The lens in accordance with the invention may possess securing means enabling said optical imager be put into position in compliance with the position indicated by said marking.

The invention also provides an ophthalmic display including an ophthalmic lens of the type specified above.

Preferably, the position of said imager relative to said lens is referenced as a function of correction parameters of said lens.

BRIEF DESCRIPTION OF THE DRAWINGS

The invention is described below in detail with reference to figures that merely show preferred embodiments of the signal.

MORE DETAILED DESCRIPTION

Figure 1:
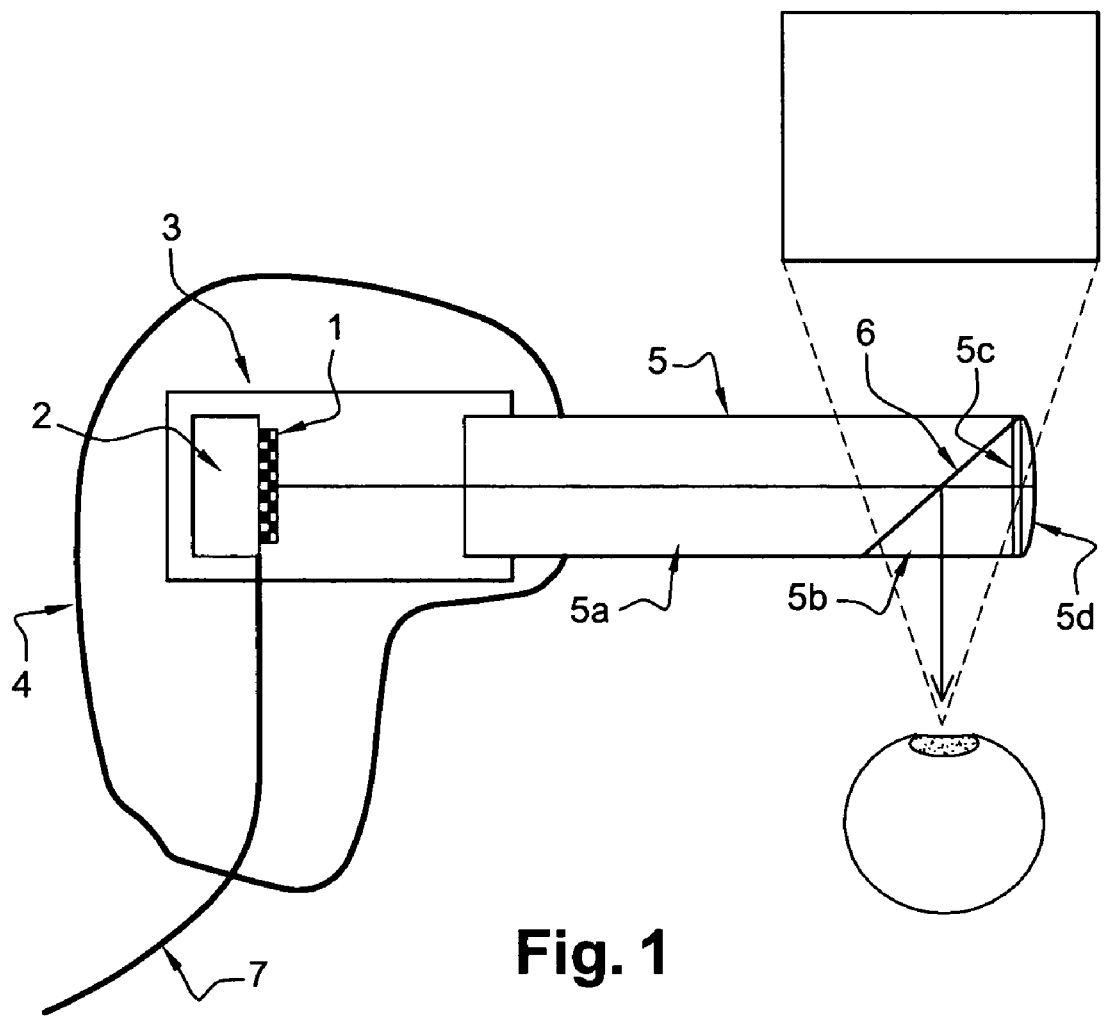
FIG. 1 is a plan view of an optical imager used in accordance with the invention, with its associated electronic and optical system.

An example of an imager as used in the invention is shown in its environment in FIG. 1.

An electronic signal bearing information is conveyed to a miniature screen 1 by a cable 7. On the basis of the signal, the miniature screen 1, as illuminated by a back-light projector 2, generates a pixel image corresponding to the information. By way of example, it is possible to use a "KOPIN Cyberdisplay 320 color" screen that generates 320×240 pixels and that presents dimensions of 4.8 millimeters (mm)×3.6 mm. The screen 1 is referenced by means of a mechanical interface 3 relative to the optical imager 5. A protective shell 4 protects all or part of the assembly.

The optical imager 5 is constituted by a propagation prism 5a, a counter-prism 5b, a quarter-wave plate 5c, and a spherical Mangin mirror 5d. A spherical Mangin mirror is a plano-spherical lens whose spherical face has been made reflective by means of an aluminum-plating treatment or the equivalent.

The imager 5 also includes polarization separation processing 6 which can be implemented in the form of a deposit of thin layers, either on the propagation prism 5a, or on the counter-prism 5b, or by means of a film that is bonded between those two elements.

This assembly operates as follows.

A light beam coming from the miniature screen 1 passes through the propagation prism 5a and reaches the polarization separator treatment 6. The polarization of the light beam emitted by the screen 1 is oriented in such a manner as to lie in the plane of incidence of light rays on the polarization separator treatment 6. It is said to be oriented in the P direction. It is thus transmitted by the treatment 6 with very good photometric efficiency. The light beam then propagates through the counter-prism 5b, prior to reaching the quarter-wave plate 5c and then the Mangin mirror 5d where it is reflected so as to pass back through the quarter-wave plate in the opposite direction. The function of the Mangin mirror 5b is to produce an enlarged image of the screen and also to position that image so that it appears at a distance that is comfortable for the user to view. Commonly, this viewing distance is adjusted so that in the end the image appears to the user as though it were situated 1 meter (m) in front of the user. In addition, the apparent size of the image can be about 12° along a diagonal, depending on the characteristics of the imager.

The quarter-wave plate 5c has its axes oriented at 45° to the polarization of the light beam. Thus, on the first passage of the light beam, it leaves in a circular polarization state. Finally, after passing through the quarter-wave plate a second time, the beam has a linear polarization state but at 90° relative to its initial polarization. In this way, when the light beam reflected by the Mangin mirror 5d has passed through the quarter-wave plate 5c for a second time and meets the polarization separator treatment 6, its direction of polarization is now perpendicular to the plane of incidence, commonly written S. It is thus reflected with a high level of photometric efficiency towards the eye of the wearer who therefore sees the image of the miniature screen 1 as enlarged by the Mangin mirror 5d.

Figure 2:
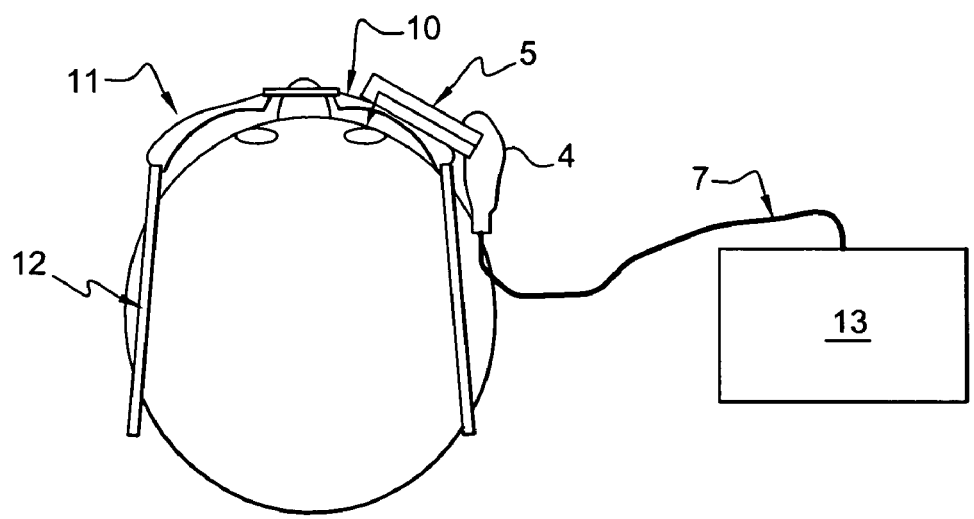
FIG. 2 is a plan view of a wearer wearing a spectacles frame including an ophthalmic device constituting a preferred embodiment of the invention.

According to the invention, an optical imager as described above is secured to a lens 10 as shown in FIG. 2.

A frame 12 carries two ophthalmic lenses 10 and 11, one of which, 10, carries the optical imager 5 so as to form an ophthalmic device in accordance with the invention. The connection cable 7 is connected to the electronic information reader 13.

The electronic reader may comprise in particular a control unit enabling the miniature screen to be switched on and performing most of the adjustments concerning brightness, color, electrical power supply of the miniature screen by means of a battery, and management controls.

The unit may contain an electronic chip or card serving to convert the electronic signal coming from a source of information content into a signal suitable for use by the miniature screen.

By way of example, the information may come from a personal computer, a DVD reader, an organizer, a telephone, or a games console.

In a preferred embodiment of the invention, the optical imager 5 is secured to the front face of the lens 10 by being fastened directly thereto.

In a variant, the optical imager 5 may be fastened on the rear face of the lens.

Furthermore, the optical imager 5 may come into contact with the lens or not, and it may pass through the lens in part or completely.

It may also be fastened in indirect manner, by interposing an intermediate part, an extension of the imager, an extension of the lens, or indeed a mechanical interface 3.

The optical imager may be fastened on the lens by adhesive so as to be non-removable. In the invention, it may also be fastened in removable manner, e.g. by interfitting shapes or by screw-fastening.

Figure 3:
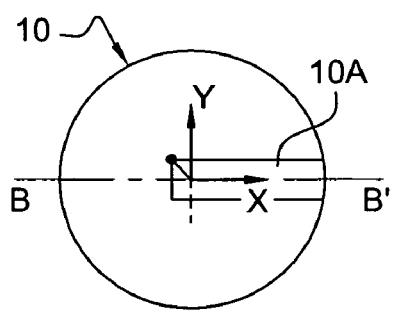
FIG. 3 is a face view of a lens in a preferred embodiment of the invention.
Figure 4:
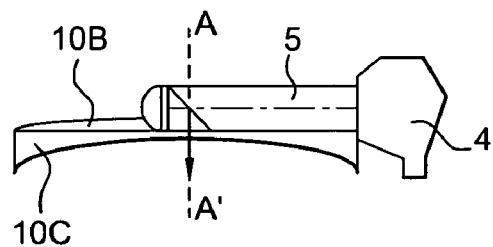
FIG. 4 is a plan view of an ophthalmic device in a preferred embodiment of the invention.

FIGS. 3 and 4 show a preferred embodiment.

The lens 10 has a groove 10A formed therein for receiving the optical imager 5 as shown in FIG. 4. The groove 10A is designed to be complementary in shape to the imager 5, in this case substantially in the form of a rectangular parallelepiped.

The lens 10 in this example is an ophthalmic lens of transparent optical material, e.g. glass or a plastics polymer. It possesses marking having functions similar to those of a conventional ophthalmic lens and referred to as "ophthalmic marking".

The lens in this example is constituted by two elements that are stuck together. The first element is an Lxc plano-convex lens 10B whose top face is spherical and of known optical power value [$P_{cx} = (n-1)/R_{cx}$, where $R_{cx}$ represents the radius of curvature of the convex surface and is a magnitude that is positive in this case, and where n represents the reflective index of the material constituting the lens] in which a rectangular slot has been machined. The second element is an Lcc plano-concave lens 10C whose bottom face is spherical and of known optical power value [$P_{cc} = (1-n)/R_{cc}$, where $R_{cc}$ represents the radius of curvature of the concave surface and in this example is a positive magnitude, and where n represents the reflective index of the material constituting the lens].

Both lenses 10B and 10C are centered, with their respective optical axes coinciding to constitute an axis A-A', and they are stuck together via their respective plane surfaces. The total power of the ophthalmic lens obtained in this way is equal to $P_{cx}+P_{cc}$.

In a variant, the lens 10 may equally well be made by injection molding a single piece of plastics material.

In this embodiment, as can be seen in FIG. 3, the position of the groove 10A is referenced relative to a right-hand rectangular frame of reference –x, y, A-A') referred to as the opto-mechanical frame of reference and centered on the two lenses 10B and 10C.

The optical imager 5 is held in the groove 10A by adhesive or by complementary shapes, and the opto-mechanical frame of reference is selected in such a manner that the output optical axis from the optical imager 5 passes through the optical center of the ophthalmic lens and coincides with the optical axis of the ophthalmic lens A-A'. The surface of the bottom of the groove 10A is perpendicular to the optical axis A-A'.

In general, and depending on the nature of the ophthalmic lenses which may also be aspherical bodies of revolution, anamophoresed aspherical, or progressive, a particular orientation is selected for the axes in the frame Oxy relative to the properties of the lens (torus axis, meridian, etc.), with a particular point being the origin (intersection of the axes, VL, VP, mounting cross, . . . ). All of these points and axes can themselves be referenced relative to the outside diameter of the lens or relative to marking on the lens. This operation is performed when the lens is fabricated.

The complete ophthalmic device is assembled in three main steps:
- the first step consists in edging the ophthalmic lens to the format of the frame;
- the second step consists in assembling the ophthalmic lens 10 and the imager 5; and
- the third step consists in mounting the edged ophthalmic lens in the frame.

The last two steps may optionally be performed in either order.

The first step of edging the ophthalmic lens 10 may be performed using a milling machine of the kind commonly used by opticians, e.g. a machine of the "Essilor Kappa" type. Similarly, mounting in the frame is conventional.

With the display of the invention, it is possible to apply correction to viewing the information image by modifying the vicinity of the display.

In the example shown in FIGS. 3 and 4, at the location where the imager 5 is fastened, only the rear face of the lens 10 performs an ophthalmic correction function. In this location, the correction is thus partial and insufficient for providing the wearer with a proper view of the image.

To solve this problem, a power difference is provided by modifying the focusing of the imager, thus enabling the image to be viewed as though it were located at some given distance, e.g. 1 m.

Thus, if it is desired to display an image that appears at a distance of 1 m to a wearer who requires correction of P diopters, then it is necessary to adjust the focusing of the optical imager at (−1+Pcx) diopters (with P=Pcx−Pcc; Pcx being the power of the convex or front face and Pcc being the power of the concave or rear face).

Furthermore, when the user looks at the surroundings outside the groove, the user's vision is properly corrected.

By means of the invention, it is possible to make a prescription lens that serves to correct the sight of a user both for seeing the surroundings and for viewing information.

Instead of being stuck to the lens 10, the optical imager 5 could be removable. Thus, when the information function is not being used, a corrective tongue can be inserted instead of the imager in order to enable the lens to provide a conventional correcting function.

An example of ophthalmic and information referencing is described below for a single-vision lens.

Figure 5:
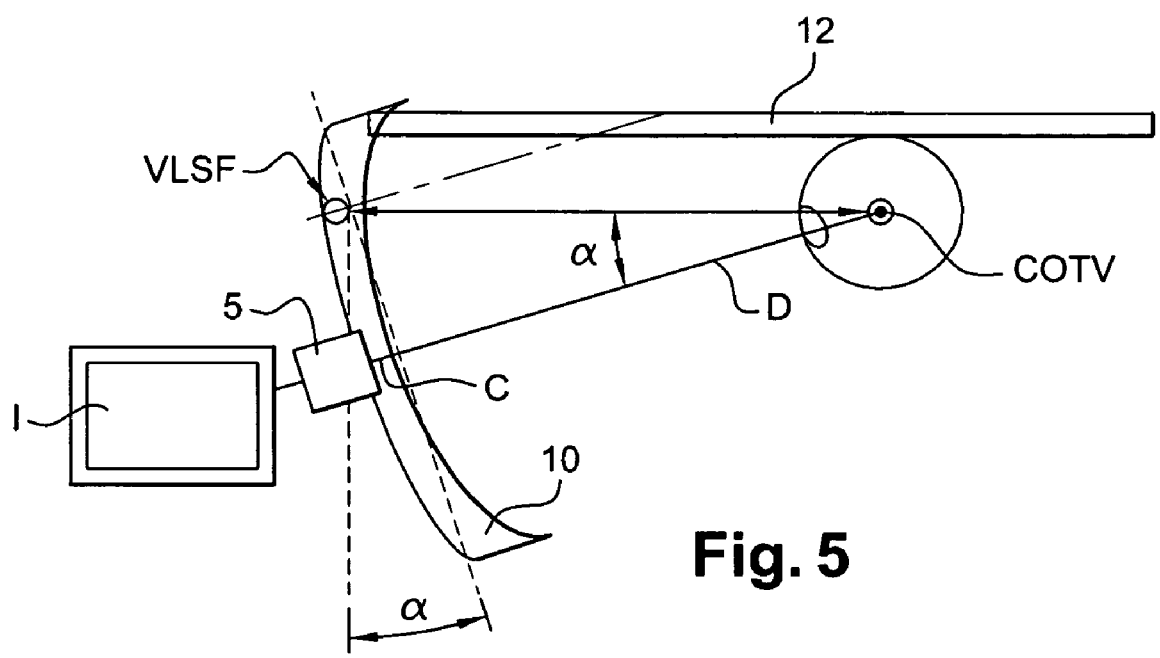
FIG. 5 is a side view showing an example of referencing in accordance with the invention, for a single-vision ophthalmic lens.

FIG. 5 is a side view of an example of referencing for a single-vision lens.

A single-vision ophthalmic lens is given conventional ophthalmic marking. In the invention, in order to reference the position of the optical imager, this marking comprises the far vision point VLSF and data suitable for constructing the virtual theoretical center of the eye COTV which corresponds substantially to the center of the wearer's eye. This data includes the distance between the lens and the virtual theoretical center of the eye COTV which advantageously lies in the range 24 mm to 31 mm, the panthoscopic angle $\alpha$ which is advantageously about 8°, and the shape angle corresponding to the inclination of the top lens which may be zero.

The far vision point VLSF may be defined at a distance from the boxing line B-B' of the lens lying in the range 0 mm to 4 mm, and it may be defined on the front face and/or the rear face of the lens.

Thereafter, a virtual point COTV is then defined outside the ophthalmic lens situated on the line passing through the far point VLSF and having direction cosines corresponding to the panthoscopic angle a and to the shape angle $\beta$ of the ophthalmic lens mounted in the frame and situated at a distance lying in the range 24 mm to 31 mm from the side of the rear face of the lens.

Advantageously, the information line of sight D that corresponds to the straight line passing through the virtual theoretical center of the eye COTV and the center of the image I obtained using the optical imager 5 then slopes downwards at an angle of 8° equal to the panthoscopic angle $\alpha$.

Thus, when the eye seeks to look at the information image, it turns in its orbit downwards describing an arc of about 8°. At this moment, and while looking straight ahead, the eye becomes aligned on the information line of sight of the system, which then coincides with the optical axis at the output from the optical imager 5.

The groove formed in the lens and receiving the optical imager 5 is such that the imager rests on a base that is plane and perpendicular to the optical axis of the ophthalmic lens. Thus, the optical axis at the output from the optical imager is not deflected by the ophthalmic lens. It thus corresponds to the observer's line of sight, enabling the observer to view the information content delivered by the optical imager under good conditions.

Since the power of the ophthalmic lens on the information line of sight is known, and in this case is equal to the optical power of its rear face, it is easy to determine the amount of focusing compensation that needs to be performed in the imager in order to correct the sight of the wearer both for observing surroundings and for observing the information.

With a progressive lens, referencing can be done in similar manner to that described above for a single-vision lens, but with reference to the far vision point VL.

What is claimed is:

1. A display comprising:
    an ophthalmic spectacle lens;
    an optical imager for shaping light beams and directing them towards the eye of the wearer so as to enable information content to be viewed, said optical imager being secured to said ophthalmic spectacle lens, said ophthalmic spectacle lens having markings for referencing for the position of said imager relative to said ophthalmic spectacle lens in order to correctly secure said imager on said ophthalmic spectacle lens, wherein said markings denote the position of the far vision point and information for defining a virtual theoretical center of the eye.

2. A display according to claim 1, wherein the information defining the virtual theoretical center of the eye are the value of the shape angle of the wearer's spectacles frame, the value of the panthoscopic angle of the spectacles frame, and a distance corresponding to the distance between said ophthalmic spectacle lens and the center of the wearer's eye.

3. A display according to claim 1, wherein said markings comprise the direction cosines of an information line of sight corresponding to the line passing through the virtual theoretical center of the eye and the center of the image obtained by means of the optical imager in the frame of reference relative to said ophthalmic spectacle lens.

4. A display comprising:
an ophthamalic spectacle;
an optical imager for shaping light beams and directing them towards the eye of the wearer so as to enable information content to be viewed, said optical imager being secured to said ophthalmic spectacle lens, said ophthalmic spectacle lens having markings for referencing for the position of said imager relative to said ophthalmic spectacle lens in order to correctly secure said imager on said ophthalmic spectacle lens, wherein said markings include a value for the power compensation to be provided by said imager.

5. An ophthalmic display comprising:
an ophthalmic spectacle lens:
an optical imager for shaping light beams and directing them towards the eye of the wearer so as to enable information content to be viewed, said optical imager being secured to said ophthalmic spectacle lens, said ophthalmic spectacle tens having markings for referencing for the position of said imager relative to said ophthalmic spectacle lens in order to correctly secure said imager on said ophthalmic spectacle lens, wherein the position of said imager relative to said ophthalmic spectacle lens is referenced as a function of correction parameters of said lens.

* * * * *